United States Patent
Bunel (10) Patent No.: US 12,496,762 B2
(45) Date of Patent: Dec. 16, 2025

(54) CONTAINER PREFORM MADE OF PLASTIC

(71) Applicant: SIDEL PARTICIPATIONS, Octeville-sur-Mer (FR)

(72) Inventor: Christophe Bunel, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 584 days.

(21) Appl. No.: 17/801,384

(22) PCT Filed: Feb. 22, 2021

(86) PCT No.: PCT/EP2021/054315
§ 371 (c)(1),
(2) Date: Aug. 22, 2022

(87) PCT Pub. No.: WO2021/170533
PCT Pub. Date: Sep. 2, 2021

(65) Prior Publication Data
US 2023/0101346 A1    Mar. 30, 2023

(30) Foreign Application Priority Data
Feb. 25, 2020 (FR) ...................................... 2001833

(51) Int. Cl.
*B29C 49/00* (2006.01)
*B29C 49/12* (2006.01)

(52) U.S. Cl.
CPC ............ *B29C 49/12* (2013.01); *B29C 49/071* (2022.05); *B29C 2949/078* (2022.05)

(58) Field of Classification Search
None
See application file for complete search history.

(56) References Cited

U.S. PATENT DOCUMENTS

2013/0244050 A1    9/2013    Witz

FOREIGN PATENT DOCUMENTS

EP    0324102 A2    7/1989
FR    3045434 A1    6/2017

OTHER PUBLICATIONS

PCT/EP2021/054315 International Search Report dated May 14, 2021.

*Primary Examiner* — Yan Lan
(74) *Attorney, Agent, or Firm* — Blake T. Hudson (57) ABSTRACT

Provided is a container preform made of plastics material having a body exhibiting symmetry of revolution about a central axis and a bottom closing the body from one of its ends. The bottom has an annular bead forming a standing plane of the preform, and the bottom has an external skin oriented toward the outside of the preform and an internal skin oriented toward the inside of the preform. At least one of the internal skin and the external skin has, radially from the central axis as far as the annular bead, a profile having a break in curvature.

19 Claims, 6 Drawing Sheets

CONTAINER PREFORM MADE OF PLASTIC

CROSS-REFERENCE TO RELATED APPLICATIONS

This application is a 371 U.S. National Stage Application of PCT Application Serial Number PCT/EP2021/054315 filed on Feb. 22, 2021, which application claims the benefit of and priority to French Application No. FR2001833, filed Feb. 25, 2020, the entire contents of each of which are hereby incorporated herein by reference.

The field of the invention is that of the design and manufacture of containers made of plastics material.

More precisely, the invention relates to a container preform made of plastics material.

Conventionally, a container made of plastics material is obtained by blow molding or stretch blow molding from a preform within a mold with the impression of the container.

Prior to the blow molding or stretch blow molding thereof, the preform is heated until its constituent material reaches or exceeds its glass transition temperature. For example, if the container is made of polyethylene terephthalate, the glass transition temperature is between 75° C. and 80° C.

A preform usually comprises:
a body, with a shape substantially in the form of a cylinder of revolution about a central axis;
a neck, which extends in the continuation of the body from a first end thereof, the neck being separated from the body by a flange;
a bottom, which closes the body at a second end thereof.
By analogy, at the end of the formation of the container:
the body of the preform becomes the body of the container;
the neck of the preform remains unchanged during the shaping process of the container;
the bottom of the preform becomes the bottom of the container.

Regardless of the shape of the bottom of the container to be formed, the vast majority of preforms have a convex bottom, with a semi-spherical shape or more generally a shape curved toward the outside.

However, the vast majority of containers have a concave bottom.

It is therefore understood that, during the shaping, the material of the bottom, starting from a convex profile, has to be reversed in order to adopt a concave profile.

This reversal gives rise to stresses in the material which may produce microcracks. A relaxation of the blow-molding stresses (drop in pressure) occurs when the formed container is extracted from the mold, and as a result the bottom of the container tends to flatten, that is to say collapse.

Such microcracks are likely to propagate when pressure is applied to the container, but also when the container is in contact with chemical products such as lubricants which may be found on the conveying lines present between two treatment stations of the containers.

Cases of breakage of container bottoms have likewise been observed in certain types of bottom (breakages occur notably in bottoms of certain containers having a petaloid bottom, provided with an alternation of protruding feet and recessed valleys and intended for carbonated beverages).

The risk of cracking (and of breakage) may be exacerbated by the market trend, seeking to save on material and to reduce polluting emissions, which tends to impose a reduction in the weight of the preforms, and therefore in the thickness of the walls of the preforms.

This risk is also exacerbated by the increase in production rates (several tens of thousands of containers produced per hour and by machine), which forces a reduction in the individual manufacturing cycle time for a container.

The reduction in injection cycle times for the preforms is another factor that may exacerbate this risk. Specifically, this reduction in cycle times leads to a significant number of residual stresses in the preforms. These stresses, which relax when the container has been formed, may lead to the flattening of the bottom of the container as mentioned above.

The consequence of the reduction in the individual manufacturing cycle time is a reduction in the time for which the container is in contact with the mold, and therefore reduced cooling of the container in the mold.

In addition, certain plastics materials (it is notably the case for PET, which is very widely employed in the manufacture of containers) have a "shape memory": in effect, during the blow molding or the stretch blow molding, these materials are subject to internal stresses which tend to relax if the temperature is still too high while the internal pressure has fallen in the container. The relaxation brings about a form of axial and radial narrowing of the containers, which, as it were, tend to return to their initial shape, namely that of the preform. In fact, the narrowing stops rapidly after exiting the mold, due to the cooling, and a container cannot regain the shape of a preform after relaxation of the stresses.

More particularly, for the containers formed, this memory effect gives rise to undesirable deformations on the bottoms of the containers, which then become unstable on standing planes, and also to a reduction in their mechanical strength. The reduction in the mechanical strength is, for example, due to the collapse of the bottom of the container which can lead to microcracks that may subsequently weaken the containers under the effect of mechanical (pressure) or chemical (lubricants) stresses.

An example of undesirable deformation corresponds to a collapse of the bottom of the container. In this case, after the container has been manufactured, the concave bottom of the deformed container has an arch with a lower height than expected. Specifically, due to insufficient cooling of the container, and more specifically of the lower part of the container, the concave bottom of the container collapses upon exiting the mold.

In particular, an aim of the invention is to remedy the drawbacks of the prior art.

More precisely, an aim of the invention is to propose a preform which makes it possible to obtain containers in which the deformation of the bottom upon exiting the mold is eliminated or, at the very least, limited.

Another aim of the invention is to propose such a preform which makes it possible to obtain containers in which the bottoms have sufficient structural mechanical characteristics to withstand the various pressures and/or stresses to which they are subjected.

Furthermore, an aim of the invention is to propose such a preform which makes it possible to increase the production rates of containers in accordance with the desired aesthetic and mechanical criteria.

These aims, and others which will become apparent below, are achieved by virtue of the invention, the subject of which is a container preform made of plastics material, comprising:
a body exhibiting symmetry of revolution about a central axis;
a bottom closing the body from one of its ends, the bottom having an annular bead forming a standing plane of the preform, the bottom having an external skin oriented toward the outside of the preform and an internal skin oriented toward the inside of the preform, characterized in that at least one of the internal skin and the external skin has, radially from the central axis as far as the annular bead, a profile having a break in curvature.

By virtue of the break in curvature, the collapse of the bottom of the container, once formed, is limited or even eliminated.

Specifically, the break in curvature of the preform is maintained during the blow molding or the stretch blow molding of the container, on the bottom of the container formed.

The break in curvature thus forms a means for arresting the flattening of the arch toward the outside of the container. This is explained further by the memory effect provided by the PET and also by the geometry of the break in curvature.

Thus, if the bottom of the container has not been cooled sufficiently and the bottom tends to collapse, this collapse is limited by the break in curvature which forms a mechanical and physical barrier.

The container formed from the preform therefore maintains all of its aesthetic and mechanical qualities to be used.

Another major advantage is that of permitting improved centering of the preforms during a step of stretching and blow molding the preform.

Specifically, a stretching rod can easily take up position in the bottom of the preform (if necessary by way of a specific design for cooperating with the bead) and/or the preform can be positioned properly on a mold bottom.

Advantageously, the profile comprises, from the central axis as far as the annular bead:
a first portion having a first radius of curvature;
a second portion extending the first portion and having a second radius of curvature;
a third portion extending the second portion and having a third radius of curvature,
the break in curvature being formed by the second radius of curvature exhibited by the second portion.

These three portions make it possible to clearly mark the presence of the break in curvature in a visual but also mechanical manner. In the absence of the second portion, the break in curvature would not be marked, and the container formed from a preform without this second portion would have a greater risk of its bottom collapsing.

Preferably, the second radius is less than 9 mm.

Such a value of the second radius allows the break in curvature to be implemented in a direct manner. A value greater than 9 mm presents a major risk of forming a continuity with the first portion or the third portion, and this would promote the collapse of the bottom formed.

According to a preferred embodiment, the first portion of the profile has a flat, concave or convex shape.

Thus, the preform can be adapted depending on the structure and the design of the bottom of the container to be manufactured.

Advantageously, the preform has a joint plane at an intersection between the bottom and the body, the joint plane having a thickness EP.

This joint plane delimits a boundary between the bottom of the preform and its body.

According to a first design rule, the profile has a maximum height, measured along the central axis, greater than or equal to 5% and less than or equal to 40% of the thickness (EP) of the joint plane.

Such a height makes it possible to avoid the collapse of the bottom of the containers and to limit the increase of the injection cycle times.

According to a second design rule, the profile of the internal skin has a maximum height different from the maximum height of the profile of the external skin.

Depending on the shape of the bottom of the container to be manufactured, it is thus possible to provide the preform with a localized excess of material between the internal skin and the external skin.

According to a third design rule, the bottom has a thickness EF greater than or equal to 60% and less than or equal to 100% of the thickness EP of the joint plane.

Preferably, the thickness EF of the bottom is greater than or equal to 70% and less than or equal to 90% of the thickness EP of the joint plane.

Such a thickness of the bottom facilitates the creep of the material during the manufacture of the container while still allowing the bottom of the container to exhibit the desired standards in terms of mechanical strength.

According to a fourth design rule, the first portion of the profile has a diameter greater than or equal to 3 mm.

Such a diameter facilitates the cooperation between the preform and a stretching rod in the context of the manufacture of a container by stretch blow molding.

According to a fifth design rule, the first portion of the profile has a diameter less than or equal to 40% of a diameter of the preform at the joint plane.

This limit in diameter of the first portion guarantees satisfactory creep of the material during the blow molding or stretch blow molding of the preform.

According to a sixth design rule, the profile of the internal skin is parallel to the profile of the external skin.

Such parallelism between the internal skin and the external skin makes it possible to manufacture a container whose bottom has a constant or virtually constant thickness. This then ensures a desired mechanical strength at all points on the bottom.

It is of course possible for several design rules to be combined with one another.

Figure 1:
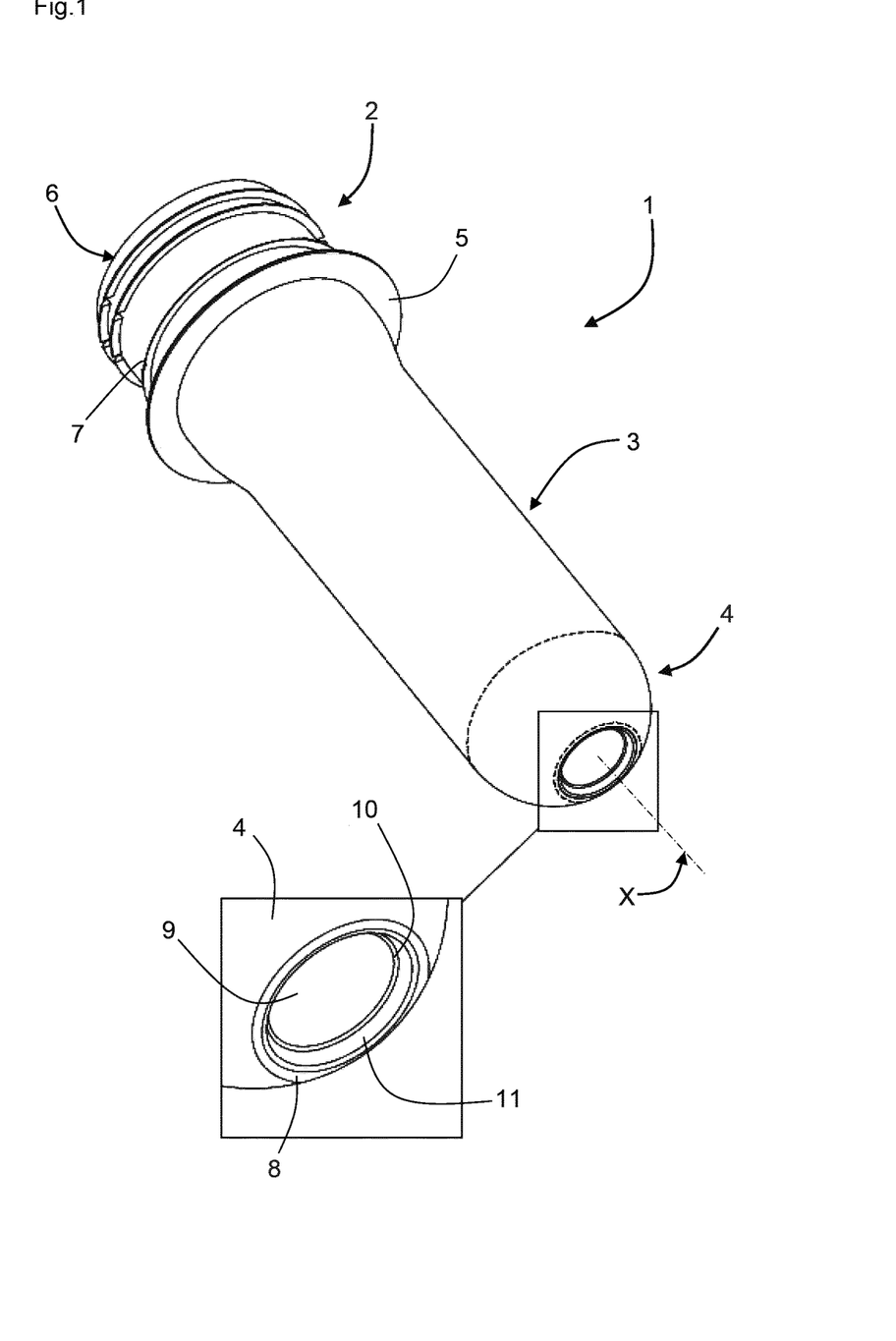
FIG. 1 is a perspective view of a preform according to the invention, having an inset of details on an enlarged scale.

Other features and advantages of the invention will become more clearly apparent on reading the following description of various preferred embodiments of the invention, which are given by way of illustrative and non-limiting example, and the appended drawings in which:

FIG. 1 illustrates a preform 1 made of plastics material according to the invention. This preform 1 is used for producing containers made of plastics material.

The preform 1 comprises:
a neck 2;
a body 3;
a bottom 4.

More precisely, the body 3 has, at a first end, the neck 2 from which it is separated by a flange 5 and, at an opposite second end, the bottom 4 which closes the preform 1.

As illustrated in FIG. 1, the neck 2 comprises a screw thread 6 allowing a cap to be attached when the preform has been transformed into a container and the latter has been closed and filled, and a bead 7 forming retaining means for retaining a tamperproof ring secured to a cap (not shown).

The preform 1 is essentially a cylinder of revolution about a central axis X.

More particularly, the body 3 and the bottom 4 are advantageously cylinders of revolution about the central axis X.

The neck 2, for its part, partially exhibits symmetry of revolution about the central axis X, only the screw thread 6 is not symmetrical.

Figure 3:
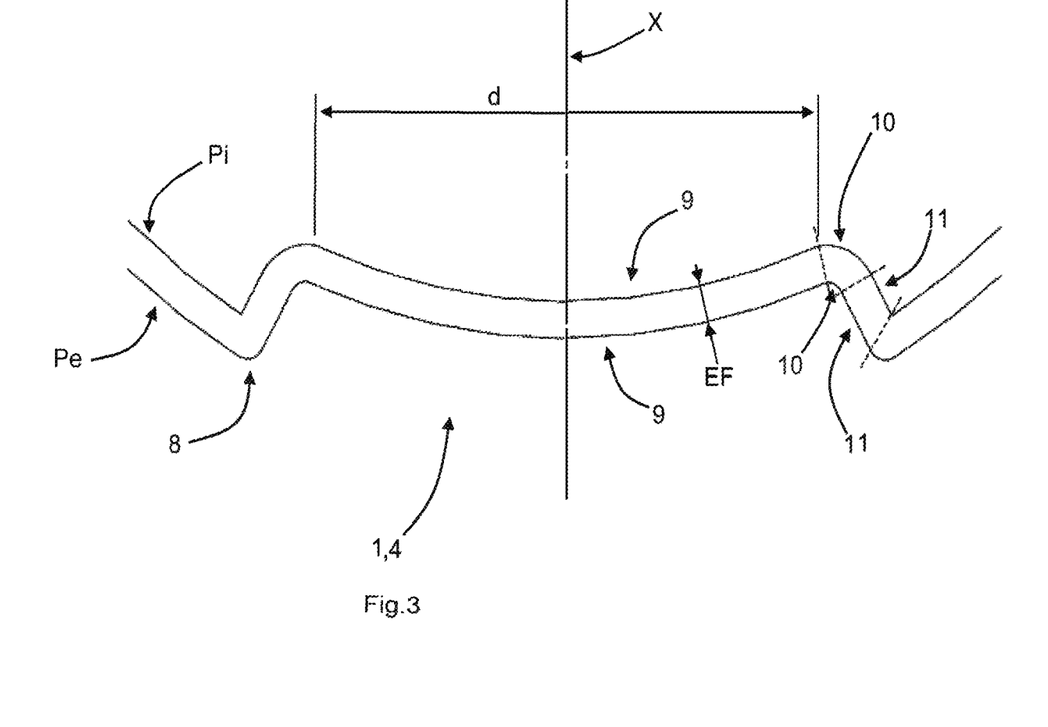
FIG. 3 is a schematic representation in section of a preform according to the invention, according to a first embodiment.
Figure 4:
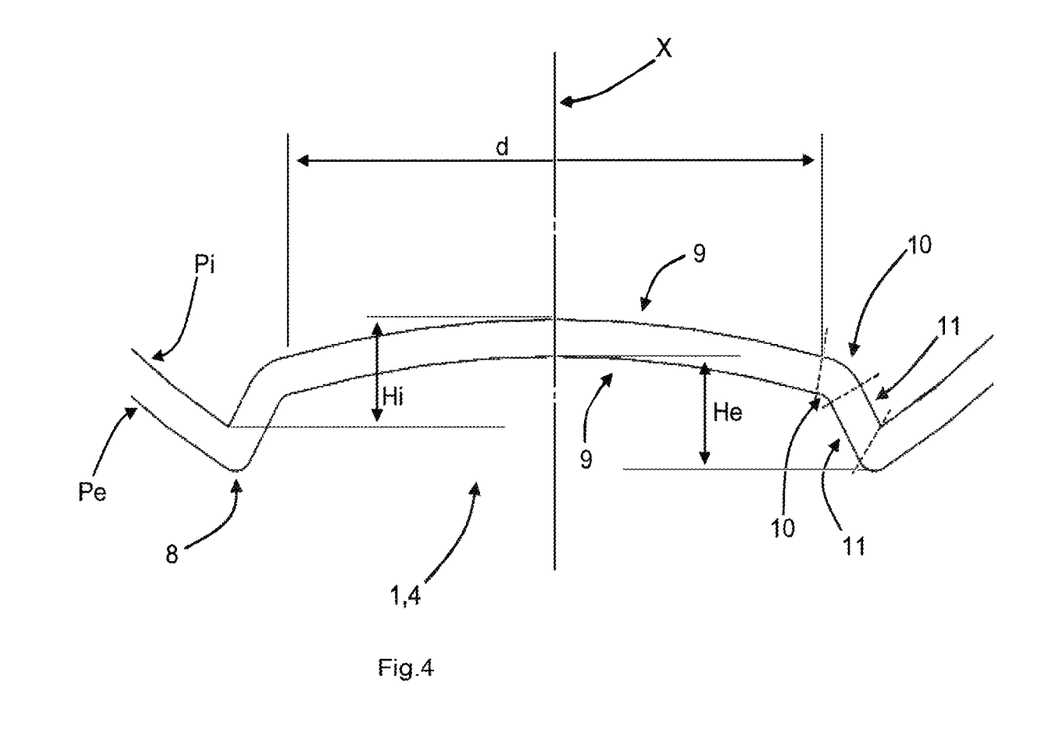
FIG. 4 is a schematic representation in section of a preform according to the invention, according to a second embodiment.
Figure 5:
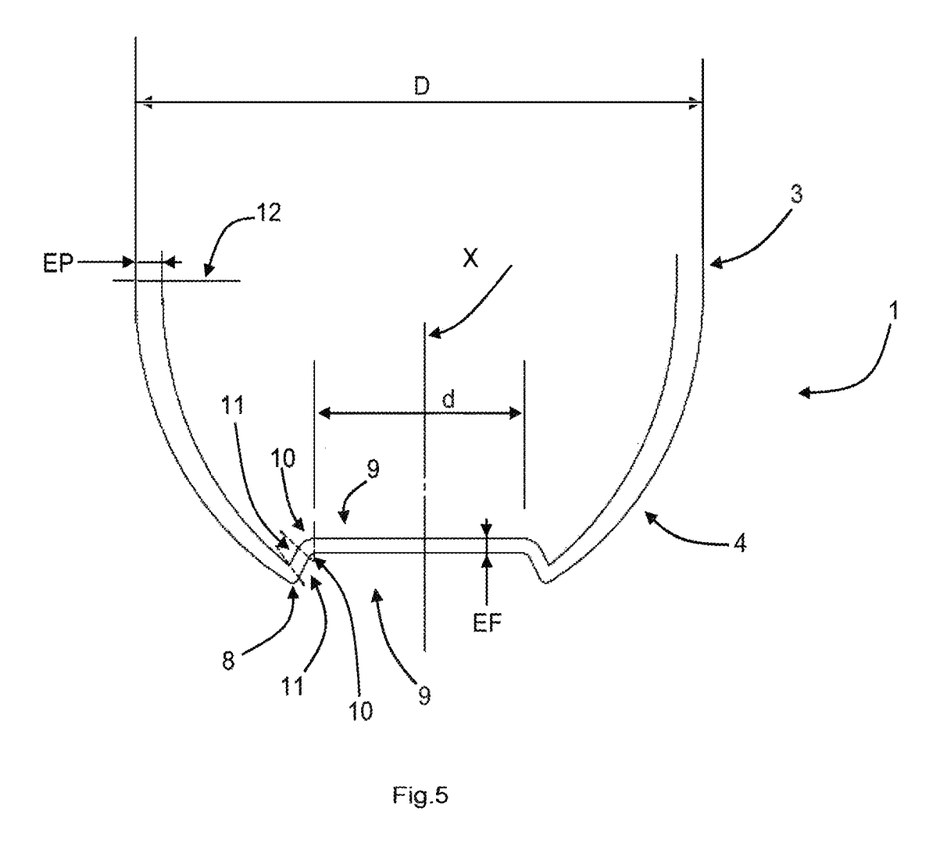
FIG. 5 is a schematic representation in section of a preform, according to a third embodiment.

As illustrated in FIGS. 3, 4 and 5, when it is viewed in section, the preform 1 has an internal skin Pi and an external skin Pe.

By way of illustrative and non-limiting example, the preform is made of PET, the glass transition temperature of which is about 75 degrees.

Still with reference to FIGS. 3, 4 and 5, the bottom 4 has an annular bead 8 forming a standing plane of the preform 1.

More precisely, this annular bead 8 forms a continuous line describing a circle, or in exceptional cases an ovoid shape depending on the overall shape of the preform.

Figure 2:
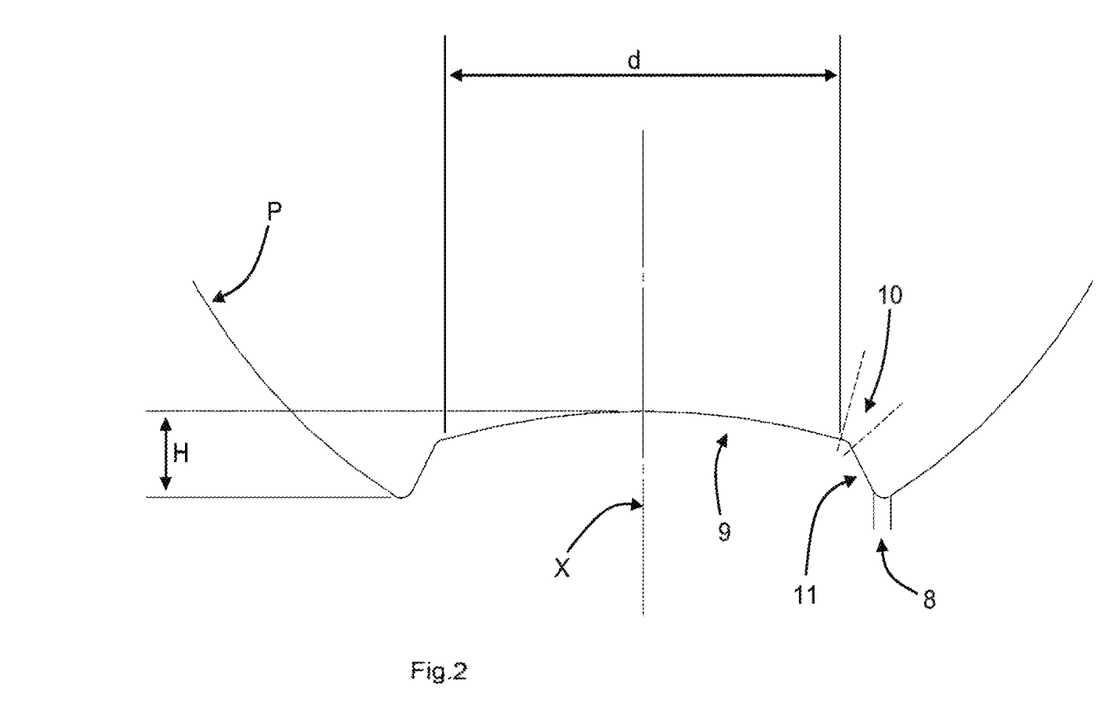
FIG. 2 is a schematic view of a profile of an internal or external skin of a preform according to the invention.

With reference to FIG. 2 which illustrates a skin P of the preform 1, independently of whether it concerns an internal skin Pi or an external skin Pe, the skin P has, radially, from the central axis X as far as the annular bead 8, a profile having a break in curvature.

What is denoted by a break in curvature is a break in the profile of the skin P.

In other words, the profile is not realized by one line having a single radius of curvature, but comprises several lines each having its own radius of curvature.

More precisely, and as is generally implemented in the prior art, the internal skin Pi or the external skin Pe defines a generally single curve. The presence of the break therefore divides this curve into at least two portions each having a different radius.

Still with reference to FIG. 2, the profile comprises, from the central axis X as far as the annular bead 8:
- a first portion 9 having a first radius of curvature;
- a second portion 10 extending the first portion 9 and having a second radius of curvature;
- a third portion 11 extending the second portion 10 and having a third radius of curvature.

The break in curvature is then formed by the second radius of curvature exhibited by the second portion 10.

According to a preferred embodiment, the second radius of curvature is less than or equal to 9 mm.

Such a value makes it possible to create the break in curvature in such a way as to implement a real and clear distinction between the first portion 9 and the third portion 11.

More precisely, the second portion 10, by way of its second radius, makes it possible to prevent a continuity of radius between the first portion 9 and the third portion 11.

More particularly, by extending, in a hypothetical manner, the first portion 9 and the third portion 11, it is possible to observe an intersection between the extensions thereof. This intersection is unique and not realized by a colinearity as would have been the case in the absence of the second portion 10 or by way of a second portion 10 having a radius of curvature equal to the first radius of curvature and/or to the third radius of curvature, and having a center of radius of curvature identical to the first radius of curvature and/or to the third radius of curvature.

The break in curvature may also be defined by a center of radius of curvature of the second portion 10 separate from the center of radius of curvature of the first portion 9 and/or of the third portion 11.

Thus, by way of this distinction between the centers of radii of curvature, it is impossible to have a continuous profile between the first radius of curvature and the third radius of curvature. More precisely, the profile is necessarily marked by a break in curvature by virtue of the distinction between the centers of radii of curvature.

The first portion 9 of the profile has a flat, concave or convex shape.

With reference to FIG. 5, the preform has a joint plane 12 at an intersection between the bottom 4 and the body 3, the joint plane 12 having a thickness EP.

With reference to FIG. 2, the profile has a maximum height H measured along the central axis, which height H is greater than or equal to 5% of the thickness EP of the joint plane 12 and less than or equal to 40% of said thickness EP of the joint plane 12.

According to the embodiments illustrated in FIGS. 3 to 5, the profile of the internal skin Pi has a maximum height Hi equal to the maximum height He of the profile of the external skin Pe (so as not to complicate the figures, the references He and Hi are visible only in FIG. 4).

In a variant, the profile of the internal skin Pi has a maximum height Hi different from the maximum height He of the profile of the external skin Pe.

Furthermore, the first portion 9 of the profile has a diameter d greater than or equal to 3 mm.

Preferably, and in any event, the diameter d of the first portion 9 of the profile is less than or equal to 40% of a diameter D of the preform 1 at the joint plane 12, as is illustrated in FIG. 5.

In other words, the radius measured between the central axis X and the second portion 10 is preferably greater than or equal to 1.5 mm and less than or equal to 20% of the diameter D.

As illustrated in FIGS. 3 and 5, the profile of the internal skin Pi is parallel to the profile of the external skin Pe.

In other words, the internal skin Pi and the external skin Pe have a homothety of degree 1.

By contrast, as is illustrated in FIG. 4, the internal skin Pi and the external skin Pe are at least partially parallel to one another, the bottom 4 of the preform 1 and more particularly the internal skin Pi and the external skin Pe then have a homothety of degree greater than degree 1.

According to a first embodiment illustrated in FIG. 3, the first portion 9 of the internal skin Pi and the first portion 9 of the external skin Pe both have a concave shape oriented toward the inside of the preform 1.

According to a second embodiment illustrated in FIG. 4, the first portion 9 of the internal skin Pi and the first portion 9 of the external skin Pe both have a convex shape oriented toward the inside of the preform 1.

According to a third embodiment illustrated in FIG. 5, the first portion 9 of the internal skin Pi and the first portion 9 of the external skin Pe are both flat.

It is of course possible for other embodiments to be used. By way of example, the internal skin Pi may have a convex shape over its first portion 9 and the first portion 9 of the external skin Pe may have a concave shape.

In contrast, the first portion 9 of the external skin Pe may have a convex shape and the first portion 9 of the internal skin Pi may have a concave shape.

According to another embodiment that is not illustrated, one of the first portion 9 of the external skin Pe and the first portion 9 of the internal skin Pi has a flat, concave or convex shape, and the other of the first portions 9 of the external skin Pe and of the internal skin Pi has a different shape.

With reference to FIG. 3, the bottom 4 has a thickness EF, measured along the central axis X between the internal skin Pi and the external skin Pe, greater than or equal to 60% of the thickness EP of the joint plane 12 and less than or equal to 100% of said thickness EP of the joint plane 12.

Preferably, the thickness EF of the bottom 4 is greater than or equal to 70% of the thickness EP of the joint plane 12 and less than 90% of the thickness EP of the joint plane 12.

As illustrated in FIG. 5, the bottom 4 of the preform thickens from the annular bead 8 as far as the joint plane 12.

Figure 6:
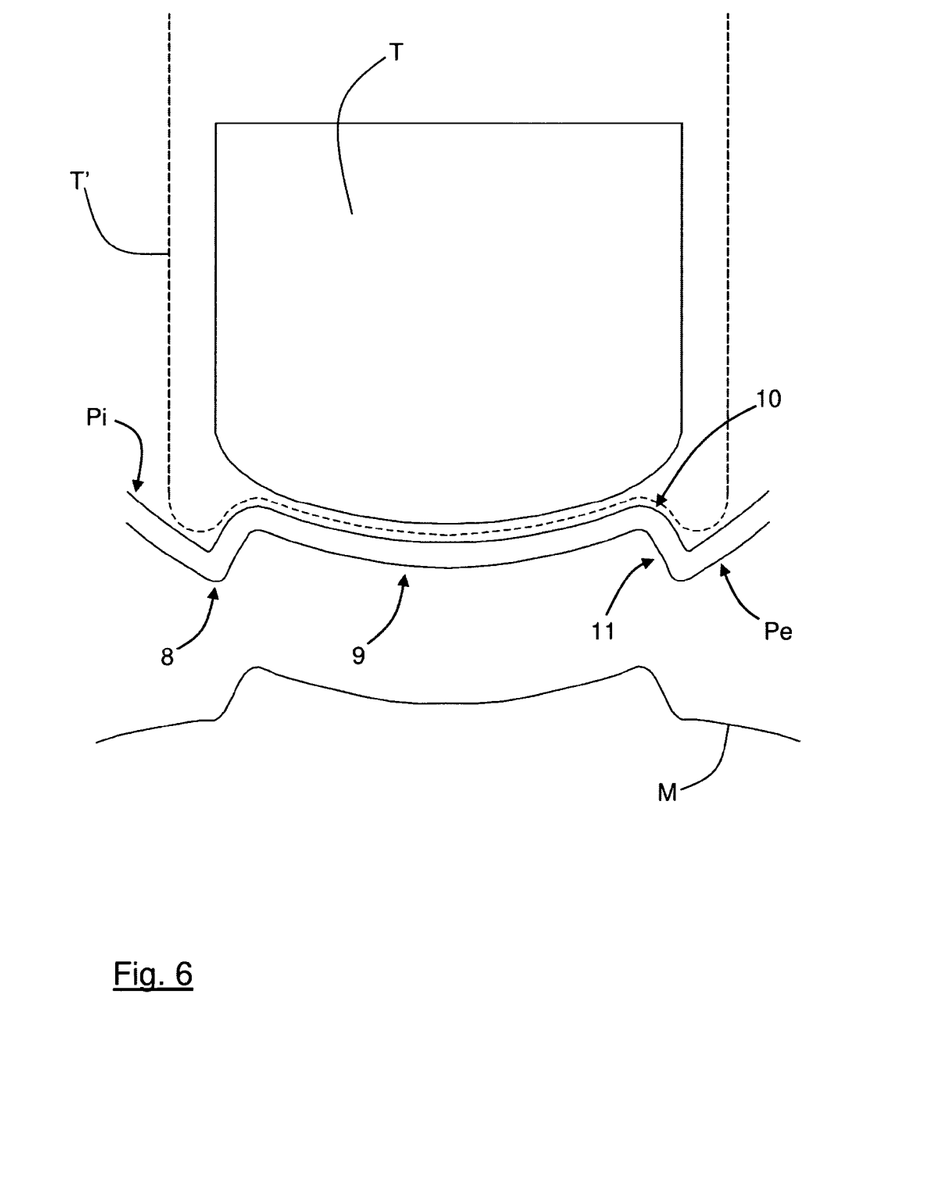
FIG. 6 is a schematic view in section of a preform in a mold during a stretch-blow-molding phase.

The bottom 4 of the preform according to the invention makes it possible, notably by virtue of its break in curvature:
- to prevent the bottoms of containers from collapsing upon exiting a blow-molding mold;
- to optimize the centering of the preform 1 on the bottom of a mold M and/or the centering of a stretching rod T, T' on the bottom of the preform, during a stretch-blow-molding phase, as illustrated in FIG. 6;
- to improve the performance of the containers formed with respect to internal or external mechanical stresses on the container;
- to increase the production rates of containers.

With reference to FIG. 6, two variants of stretching rods T, T' are shown. A first variant (reference T) makes it possible to press the plastics material of the preform 1 against the mold M. A second variant (reference T') makes it possible, in addition, to reinforce the centering of the preform 1 by surrounding the first portion 9, the second portion 10 and at least partially the third portion 11 of the bottom 4.

More particularly, the break in curvature forms a reinforcement making it possible to limit the collapse of the bottom of the container, and notably of the bottom of the arch of the container, said arch being formed by the first portion 9 of the preform 1. Specifically, the break in curvature forms a means for arresting the collapse of the bottom of the container and makes it possible to maintain an arch in the container. This limitation of the collapse is enhanced by the physical memory of PET.

Such a collapse occurs notably when the bottom of the container has not been cooled sufficiently upon exiting the mold, such a lack of cooling generally coinciding with too short a contact time between the plastics material and the mold during the manufacture of the container, and more precisely during the blow-molding or stretch-blow-molding step.

The offset formed by the first portion 9, the second portion 10 and the third portion 11 of the profile of the external skin Pe with the annular bead 8 of the preform 1 makes it possible to ensure that the preform 1 is centered on the bottom of the mold M during the stretch-blow-molding phases. To this end, the mold M may notably have a projection with the impression of the annular bead 8 of the preform 1 or of the profile of the external skin Pe of the preform 1 so as to allow the shapes of the preform 1 and the bottom of the mold M to cooperate.

Finally, the blow-molding rates may be increased by virtue of the preform 1 according to the invention since, even in the absence of prolonged contact between the material and the mold during the blow molding or stretch blow molding, the deformation of the bottom of the container upon exiting the mold is controlled and/or limited, thus allowing the container to be used in spite of a risk of deformation, since the avoidance of the collapse of the bottom allows the container to maintain its stability on a standing plane. In addition, the deformation of the bottom may be barely perceptible for the user depending on the value of the radii of curvature of each of the first portion 9, the second portion 10 and the third portion 11 of the preform 1.

The invention claimed is:

1. A container preform (1) made of plastics material, comprising:
   - a body (3) exhibiting symmetry of revolution about a central axis (X); and
   - a bottom (4) closing the body (3) from one of its ends, the bottom (4) having an annular bead (8) forming a standing plane of the preform (1), the bottom (4) having an external skin (Pe) oriented toward the outside of the preform (1) and an internal skin (Pi) oriented toward the inside of the preform (1), the preform having a joint plane (12) at an intersection between the bottom (4) and the body (3), the joint plane (12) having a thickness (EP), wherein:
   - at least one of the internal skin (Pi) and the external skin (Pe) has, radially from the central axis (X) as far as the annular bead (8), a profile having a break in curvature, the profile comprising, from the central axis (X) up to the annular bead (8), a first portion (9) having a first radius of curvature, a second portion (10) extending the first portion (9) and having a second radius of curvature, a third portion (11) extending the second portion (10) and having a third radius of curvature; the break in curvature being formed by the second radius of curvature presented by the second portion (10), and
   - wherein the first portion (9) of the profile has a diameter (d) less than or equal to 40% of a diameter (D) of the preform (1) at the joint plane (12).

2. The container preform (1) as claimed in claim 1, wherein the second radius is less than 9 mm.

3. The container preform (1) as claimed in claim 1, wherein the first portion (9) of the profile has a concave or convex shape.

4. The container preform (1) as claimed in claim 1, wherein the profile has a maximum height (H), measured along the central axis (X), greater than or equal to 5% and less than or equal to 40% of the thickness (EP) of the joint plane (12).

5. The container preform (1) as claimed in claim 4, wherein the profile of the internal skin (Pi) has a maximum height (Hi) different from the maximum height (He) of the profile of the external skin (Pe).

6. The container preform (1) as claimed in claim 1, wherein the bottom (4) has a thickness (EF) greater than or equal to 60% and less than or equal to 100% of the thickness (EP) of the joint plane (12).

7. The container preform (1) as claimed in claim 6, wherein the thickness (EF) of the bottom (4) is greater than or equal to 70% and less than or equal to 90% of the thickness (EP) of the joint plane (12).

8. The container preform (1) as claimed in claim 1, wherein the first portion (9) of the profile has a diameter (d) greater than or equal to 3 mm.

9. The container preform (1) as claimed in claim 1, wherein the profile of the internal skin (Pi) is parallel to the profile of the external skin (Pe).

10. The container preform (1) as claimed in claim 2, wherein the first portion (9) of the profile has a concave or convex shape.

11. The container preform (1) as claimed in claim 1, wherein the profile has a maximum height (H), measured along the central axis (X), greater than or equal to 5% and less than or equal to 40% of the thickness (EP) of the joint plane (12).

12. The container preform (1) as claimed in claim 2, wherein the profile has a maximum height (H), measured along the central axis (X), greater than or equal to 5% and less than or equal to 40% of the thickness (EP) of the joint plane (12).

13. The container preform (1) as claimed in claim 3, wherein the profile has a maximum height (H), measured along the central axis (X), greater than or equal to 5% and less than or equal to 40% of the thickness (EP) of the joint plane (12).

14. The container preform (1) as claimed in claim 1, wherein the bottom (4) has a thickness (EF) greater than or equal to 60% and less than or equal to 100% of the thickness (EP) of the joint plane (12).

15. The container preform (1) as claimed in claim 2, wherein the bottom (4) has a thickness (EF) greater than or equal to 60% and less than or equal to 100% of the thickness (EP) of the joint plane (12).

16. The container preform (1) as claimed in claim 3, wherein the bottom (4) has a thickness (EF) greater than or equal to 60% and less than or equal to 100% of the thickness (EP) of the joint plane (12).

17. The container preform (1) as claimed in claim 1, wherein the first portion (9) of the profile has a diameter (d) greater than or equal to 3 mm.

18. The container preform (1) as claimed in claim 2, wherein the first portion (9) of the profile has a diameter (d) greater than or equal to 3 mm.

19. The container preform (1) as claimed in claim 1, wherein the profile of the internal skin (Pi) is parallel to the profile of the external skin (Pe).

* * * * *